Dec. 31, 1935.  F. TURRETTINI  2,026,448
TOOL CLAMPING AND EJECTING DEVICE
Filed Jan. 23, 1935
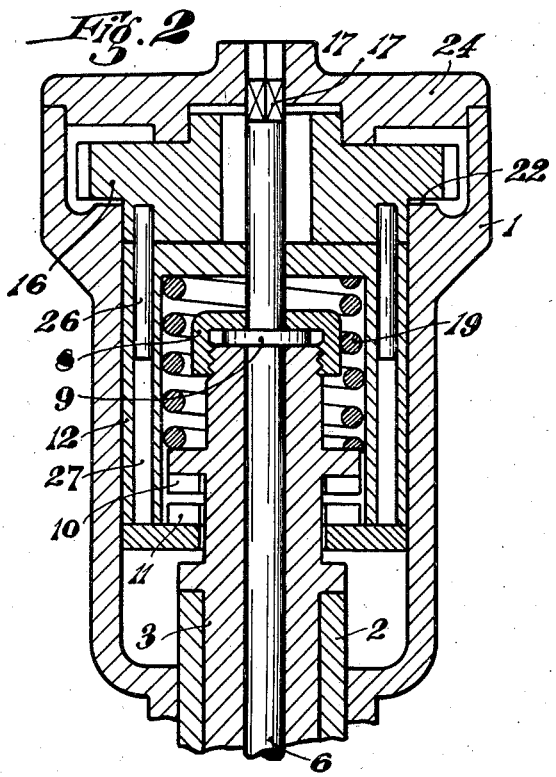
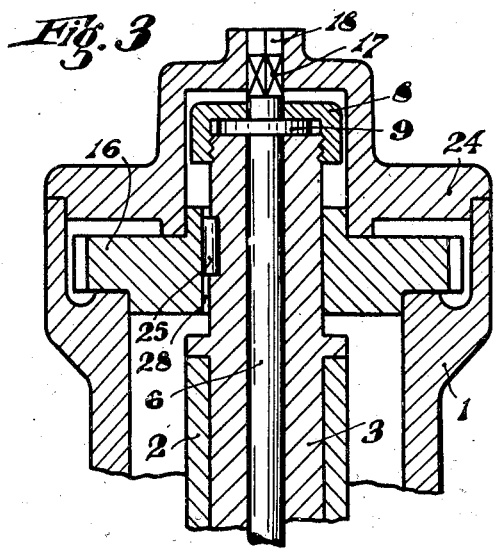
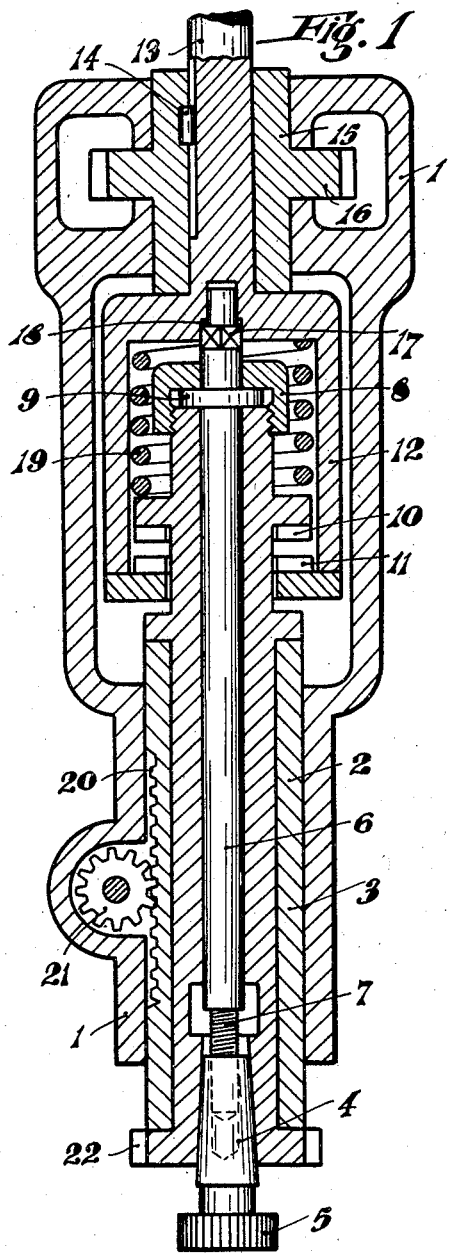
F. Turrettini
Inventor
By: Glascock Downing Seebold
Attys.

Patented Dec. 31, 1935

2,026,448

UNITED STATES PATENT OFFICE 2,026,448

TOOL CLAMPING AND EJECTING DEVICE

Fernand Turrettini, Bellevue, Switzerland, assignor to Societe Genevoise d'Instruments de Physique, Geneva, Switzerland, a firm of Switzerland Application January 23, 1935, Serial No. 3,157
In Switzerland February 1, 1934

4 Claims. (Cl. 90—11)

This invention relates to tool clamping and ejecting devices and particularly to devices for clamping tools having a conical shank to the conical socket provided in the nose of a tool spindle of machine-tools and for ejecting the tool from the socket after its use.

It is known that after using a tool having a conical shank, such as a Morse cone or the like, the working pressure to which the tool was subjected has firmly wedged the tool into the conical socket of the tool spindle, and that it is often difficult to eject the tool after its use.

The present invention has as object the provision of an improved mechanism for clamping tools and for ejecting them from a tool spindle of the type wherein a draw-in rod axially extends within the spindle and is rotatable relative to the spindle but axially movable together with the spindle and provided with a screw thread screwing into the shank of the tool.

The accompanying drawing illustrates three different embodiments of the invention.

Figure 1 is an axial section through the tool spindle support of a drilling or milling machine.

Figures 2 and 3 are each a fragmentary section through a spindle support according to a modified form of invention.

The device shown in Figure 1 comprises a frame or casing 1 containing an axially slidable but nonrotatable spindle supporting sleeve 2 within which there is rotatably mounted but axially fixed to the sleeve, a spindle 3 provided in its bottom end with a conical socket in which the conical shank 4 of a tool 5 is introduced. The spindle 3 is hollow and has fitting therein a draw-in rod 6 its lower end being provided with a screw thread 7 adapted to screw into a correspondingly threaded hole in the tool shank 4. The spindle 3 and the rod 6 are maintained against axial displacement relative to each other by a nut 8 screwing on the spindle and clamping a collar 9 of the rod between itself and the top end of the spindle. The spindle is provided with teeth or jaws 10 adapted to engage with corresponding teeth or jaws 11 provided on a cylindrical driver 12 integral with a shaft 13 fitted with a feather key and mounted for rotation with, but axially slidable relative to, the hub 15 of a gear wheel 16 which is intended to be driven by a motor (the latter not being shown). The top end of the rod 6 is provided with a square 17 capable of engaging a hole 18 of corresponding cross section provided in the driver 12. A coiled spring 19 is lodged within the driver to normally maintain the teeth 10 and 11 in engagement. The sleeve 2 is provided with a rack 20 engaging with a wheel 21 which may be actuated by hand or by any convenient mechanical actuation means.

In the working position of the device, the teeth 10 and 11 are applied against each other by the spring 19 and when the driver 12 rotates, it imparts a movement of rotation to the spindle 3. When it is desired to remove the tool 5, the wheel 21 is turned to move the sleeve 2 upwardly so that the spindle 3 and the rod 6 follow the movement of the sleeve.

In the beginning of this upward movement, the spring 19 holds the teeth 10 and 11 engaged and the driver 12 is raised until it abuts against the hub 15. From then on the spindle 3 and the rod 6 move alone and the spring 19 is compressed, while the teeth 10 disengage from the teeth 11, as represented in the drawing. The spindle 3 is now separated from the driver 12, while the rod 6 comes in engagement with the driver by the square 17 penetrating into the hole 18 of the driver. When now the spindle is turned, for example by means of a tool engaging the notches 22 and actuated by hand, the tool 5 which is tightly clamped into the socket of the spindle 3, starts to turn with the spindle while the rod 6 engaging the driver 12, stays immobile since the driving mechanism is supposed to be fully irreversible. The shank 4 is therefore slightly unscrewed from the thread 7 and will move downwards relative to the spindle so that the two conical surfaces move out of engagement with each other and the tool is ejected.

In order to clamp the tool 5 to the spindle, it is first screwed upon the screw 7, then the spindle is lifted by means of the wheel 21, and when disengaged from the driver 12, the spindle is turned in the opposite direction than before so that the screw 7 screws into the shank 4 and applies it firmly towards the conical socket of the spindle.

When the tool has been clamped, or when it has been ejected, the spindle 3 falls back into its original position and the teeth 10 and 11 engage again with each other.

In the example shown in Fig. 2 the driving mechanism of the spindle is supposed to be hardly reversible. The tool spindle is again rotatably inserted in the sleeve 2 which is axially slidable within the casing 1 and the draw-in rod 6 is connected to the spindle 3 by means of the nut 9 maintaining the collar 9 of the spindle between itself and the upper end of the spindle. The lower end of the spindle is provided, as in Fig. 1 with a conical socket for receiving the conical shank of a tool which will be screwed to the bottom end of the draw-in rod 6.

The spindle 3 is provided with teeth 10 adapted to engage with corresponding teeth or jaws 11 on a driver 12 which is again connected for rotation with the driving gear wheel 16, by means of pins 26 secured to the gear wheel and engaging holes 27 in the driver 12. The rod 6 freely penetrates through the driver 12 and through the gear wheel 16 and has its upper end provided with a square head 17 adapted to engage a hole 18 of corresponding cross section provided in a fixed cover 24 of the casing 1. The gear wheel 16 is rotatably mounted between the surfaces 22 and 23 of the casing 1 and of the cover 24, respectively.

The described device operates in a manner analogous to that described with respect to Fig. 1. In working position, the spring 19 maintains the teeth 10 of the spindle 3 in engagement with the teeth 11 of the driver 12, and the movement of rotation of the gear wheel 16 is transmitted to the spindle, the square head 17 of the rod 6 being then situated below the hole 18 in the cover 24. When it is desired to remove the tool from the spindle, the spindle is lifted by means similar to these shown in Fig. 1, so that spindle 3 and rod 6 arrive in the position shown in Fig. 2 in which the teeth 10 and 11 are out of mesh with each other and the square head 17 is engaged in the hole 18, thus locking the rod 6 against being rotated.

When now the spindle is turned by hand, the tool turning with the spindle, unscrews from the locked draw-in rod 6 and is ejected from the conical socket in the spindle.

In the example according to Fig. 3 the driving wheel 16 for the spindle is a wheel the movement of which is easily reversible. This may be the case in smaller drilling machines, for example, in which the wheel 16 is directly driven by a small electric motor; the spindle can then be rotated by hand in either direction without it being necessary to disengage the spindle from the driving wheel. For this reason, in Fig. 3, the spindle 3 is connected to the wheel 16 by means of a key 25 slidably engaged in a groove 28 of the wheel. In order to disengage the tool from the bottom end of the spindle, the sleeve 2, spindle 3 and rod 6 are raised as in Fig. 1, but the spindle remains in engagement with the driving wheel 16. The square head 17 of the rod 6 again engages in a hole of square cross section 18 in the cover 24 of the casing 1 and by turning the spindle by hand, a movement of rotation of the spindle relative to the locked draw-in rod 6 produces ejection of the tool in the manner described above.

I claim:—

1. In a tool spindle assembly for machine-tools having a rotatable and axially movable tool spindle, said spindle being provided with a conical socket adapted to receive the conical shank of a tool, a driving member for imparting rotation to the spindle, clutch means for connecting the spindle to the driving member, said spindle being axially movable relative to the driving member for disengaging said clutch means, a draw-in rod axially traversing the spindle and provided with a threaded end extending into the conical socket of the spindle for screwing into the shank of a tool inserted in the socket, said rod being axially fixed relative to the spindle but rotatable relative thereto, and coacting means on the draw-in rod and on the driving member whereby upon axial displacement of the spindle and the rod to disengage said clutch means the rod engages with the driving member and is locked against rotation relative thereto, while the spindle is disconnected from the driving member and may be rotated by hand relative to the draw-in rod.

2. In a tool spindle assembly for machine-tools having a rotatable and axially movable tool spindle, said spindle having one end thereof provided with a conical socket adapted to receive the conical shank of a tool, a driving member for imparting rotation to the spindle, a casing supporting said driving member and said spindle said spindle being axially movable relative to the casing and to the driving member, a draw-in rod axially traversing the spindle and provided with a threaded end portion extending into the conical socket of the spindle for screwing into the shank of a tool inserted in the socket, said rod being axially fixed relative to the spindle but rotatable relative thereto, and means on the draw-in rod which upon axial movement of the spindle and the rod engages with said casing for locking the draw-in rod against rotation and permitting rotation of the spindle relative to the rod.

3. In a tool spindle assembly for machine-tools having a rotatable and axially movable spindle, said spindle having one end thereof provided with a conical socket adapted to receive the conical shank of a tool, a draw-in rod extending axially of the spindle and provided with a threaded end extending into the conical socket of the spindle for screwing into the shank of a tool, said draw-in rod being rotatable relative to the spindle, means for preventing axial movement of the draw-in rod relative to the spindle, means for effecting axial displacement of the spindle together with the draw-in rod, and means engaging with the draw-in rod upon effecting such axial displacement, to lock the draw-in rod against rotation.

4. In a tool spindle assembly for machine-tools having a rotatable and axially movable tool spindle, a driving member for imparting rotation to the tool spindle, clutch means for connecting the spindle to the driving member, said spindle having one end thereof provided with a conical socket adapted to receive the conical shank of a tool, a draw-in rod extending axially of the spindle and provided with a threaded end extending into the conical socket of the spindle for screwing into the shank of the tool, said draw-in rod being rotatable relative to the spindle, means for preventing axial movement of the draw-in rod relative to the spindle, means for effecting axial displacement of the spindle together with the draw-in rod relative to said driving member for disengaging said clutch means, and means engaging with the draw-in rod upon effecting axial displacement of the spindle, for locking the draw-in rod against rotation.

FERNAND TURRETTINI.